US007283652B2

(12) United States Patent
Mendonca et al.

(10) Patent No.: US 7,283,652 B2
(45) Date of Patent: Oct. 16, 2007

(54) METHOD AND SYSTEM FOR MEASURING DISEASE RELEVANT TISSUE CHANGES

(75) Inventors: Paulo Ricardo Mendonca, Clifton Park, NY (US); Matthew William Turek, Glenville, NY (US); James Vradenburg Miller, Clifton Park, NY (US); Robert August Kaucic, Niskayuna, NY (US); Peter Henry Tu, Schenectady, NY (US); Tony Chishao Pan, Niskayuna, NY (US)

(73) Assignee: General Electric Company, Niskiayuna, NY (US)

( * ) Notice: Subject to any disclaimer, the term of this patent is extended or adjusted under 35 U.S.C. 154(b) by 868 days.

(21) Appl. No.: 10/065,894

(22) Filed: Nov. 27, 2002

(65) Prior Publication Data

US 2004/0101176 A1 May 27, 2004

(51) Int. Cl.
*G06K 9/00* (2006.01)
(52) U.S. Cl. ...................................... 382/128; 382/131
(58) Field of Classification Search ................ 382/128, 382/130–133, 173, 190; 600/407, 427
See application file for complete search history.

(56) References Cited

U.S. PATENT DOCUMENTS 5,437,279 A * 8/1995 Gray ........................... 600/427
5,579,766 A * 12/1996 Gray ........................... 600/407
6,175,755 B1   1/2001 Hogg et al. .................. 600/407
6,466,687 B1  10/2002 Uppaluri et al. ............. 382/128

OTHER PUBLICATIONS

Kimmel M et al., "Stochastic Models of Progression of Cancer and Their Use In Controlling Cancer-Related Mortality", Proceedings of the 2002 American Control Conference (IEEE Cat. No. CH37301), Danvers, MA, May 8-10, 2002, pp. 3443-3448.

* cited by examiner

*Primary Examiner*—Duy M. Dang
(74) *Attorney, Agent, or Firm*—Eileen W. Gallagher; Jean K. Testa

(57) ABSTRACT

A method and system for measuring disease relevant tissue changes for use in quantifying, diagnosing and predicting a given disease are provided. The method comprises applying at least one segmenting process to the image data to generate a plurality of segmented regions of interest, extracting features relevant for a given disease from the segmented regions to generate extracted features, and mathematically modeling the features for use in one of diagnosing, quantifying and predicting changes indicative of the given disease. The system comprises an imaging device for acquiring the image data and an image process configured to segment, extract and mathematically model disease relevant features.

20 Claims, 2 Drawing Sheets

METHOD AND SYSTEM FOR MEASURING DISEASE RELEVANT TISSUE CHANGES

BACKGROUND OF INVENTION

This invention relates to a method and system for processing medical image data to aid in the detection and diagnosis of disease, and more particularly, to a method and system for measuring tissue changes associated with chronic lung disease in medical images obtained from an x-ray computed tomography (CT) system.

An x-ray chest radiograph system is the more commonly used diagnostic tool useful for the purpose of detecting lung disease in humans. Lung disease such as bronchitis, emphysema and lung cancer are also detectable in chest radiographs and CT. However, CT systems generally provide over 80 separate images for a single CT scan thereby providing a considerable amount of information to a radiologist for use in interpreting the images and detecting suspect regions that may indicate disease.

Suspect regions are defined as those regions a trained radiologist would recommend following through subsequent diagnostic imaging, biopsy, functional lung testing, or other methods. The considerable volume of data presented by a single CT scan presents a time-consuming process for radiologists. Conventional lung cancer screening generally involves a manual interpretation of the 80 or more images by the radiologist. Fatigue is therefore a significant factor affecting sensitivity and specificity of the human reading. In other diseases, such as emphysema, it is difficult for a radiologist to classify the extent of disease progression by only looking at the CT images.

Chronic Obstructive Pulmonary Disease (COPD) is identified based on symptoms including coughing, wheezing, and shortness of breath (dyspnea). COPD includes a number of respiratory diseases, the most prominent of which are emphysema and chronic bronchitis. COPD affects large airways, small airways and parenchyma in patients. Diseases are typically caused by smoking and air pollution, and are linked to genetic predisposition causing alpha-anti-elastase deficiency.

Emphysema, or airspace destruction, is the most prominent feature of parenchymal change in COPD patients. Emphysema is the result of the loss of elastic recoil of lung tissue. There are four types of emphysema: centrilobular, panlobular or panacinar, distal acinar or paraseptal, and irregular. The first two types contribute to the majority of emphysematous COPD. The classification is based on the anatomical distribution of airspace destruction within a lobule, which is a cluster of acini. Currently, emphysema can be classified only through post mortem examination. Emphysema is typically diagnosed by gross physiological responses, medical imaging and post mortem anatomical inspection. The use of high resolution CT image data is a promising technique for measuring the lung volume for diagnosis purposes. However, one of the more prominent disease indicators is degradation of the alveoli and other tissue changes of the lung which are currently difficult to measure from CT image data.

Detecting emphysema at early stages is most desirable. The damage caused by emphysema is often detected at later stages of the disease and the effects are permanent. Although the effects of emphysema cannot be reversed, early diagnosis of emphysema may enable measures to be taken by the patient to prevent further progression of the damage caused by the disease. Further, as more and more therapy and drug treatments are discovered, it will be desirable to monitor a patient's response to such treatment.

What is needed is a robust method and system for measuring disease relevant tissue changes in medical images to enable diagnosis and tracking of various forms of COPD.

SUMMARY OF INVENTION

In a first aspect, a method at least one of quantifying, diagnosing and predicting disease relevant changes acquired from image data is provided. The method comprises applying at least one segmenting process to the image data to generate a plurality of segmented regions of interest, extracting features relevant for a given disease from the segmented regions to generate extracted features, and mathematically modeling the features for use in one of diagnosing, quantifying and predicting changes indicative of the given disease.

In a second aspect, a system for at least one of quantifying, diagnosing and predicting disease relevant changes from acquired image data is provided. The system comprises an imaging device for acquiring the image data and an image processor. The image processor is configured for applying at least one segmenting process to the image data to generate a plurality of segmented regions of interest and extracting features relevant for a given disease from the segmented regions to generate extracted features, and the image processor further configured for mathematically modeling the features for use in one of diagnosing, quantifying and predicting changes indicative of the given disease.

BRIEF DESCRIPTION OF DRAWINGS

The features and advantages of the present invention will become apparent from the following detailed description of the invention when read with the accompanying drawings in which.

DETAILED DESCRIPTION

Figure 1:
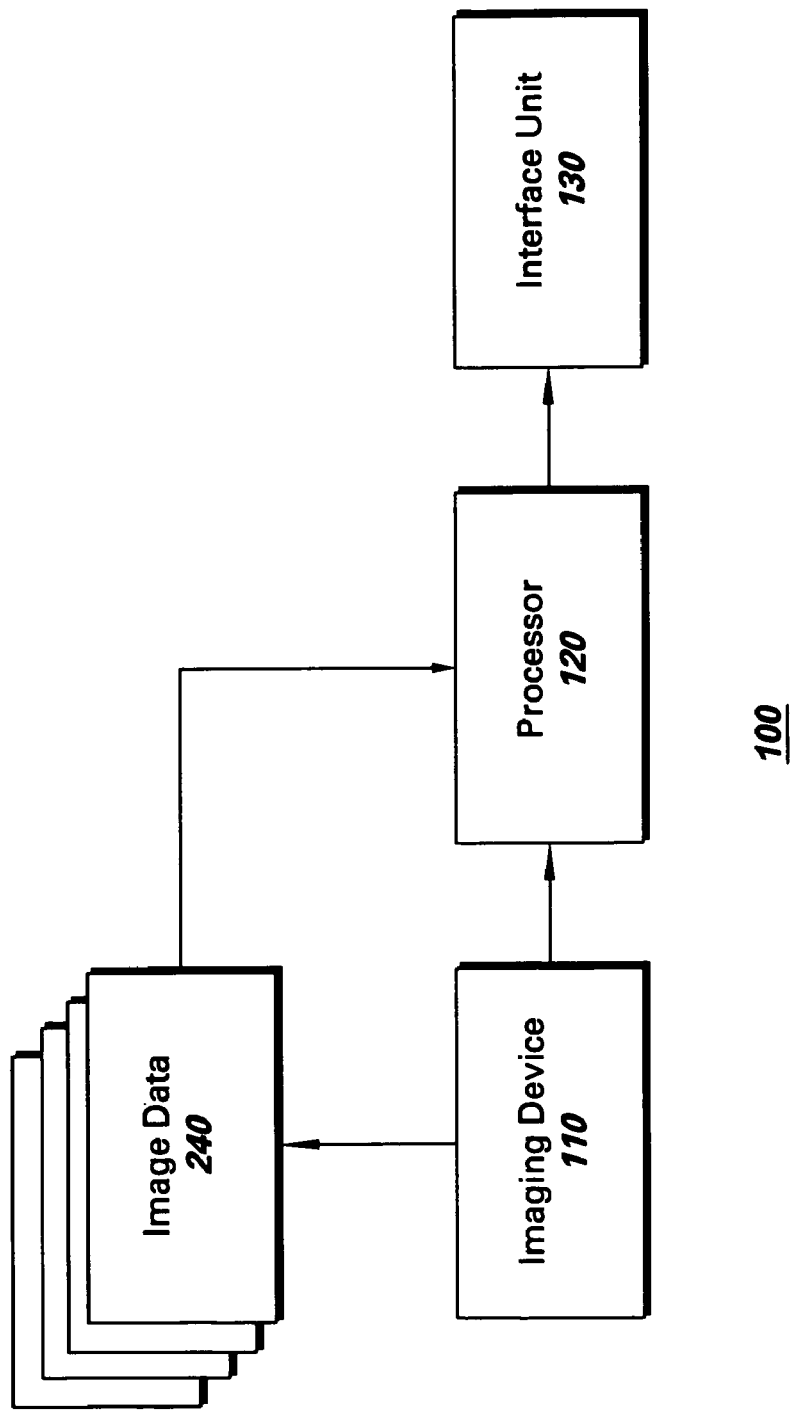
FIG. 1 is a block diagram illustration of a medical imaging system for which embodiments of the present invention are applicable; and, FIG. 2 is a block diagram and exemplary illustrations of methods employing the present invention.

Referring to FIG. 1, a general block diagram of a system 100 for disease detection is shown. System 100 includes an imaging device 110, which can be selected from a number of medical imaging devices known in the art for generating a plurality of images. Most commonly, computed tomography (CT) and magnetic resonance imaging (MRI) systems are used to generate a plurality of medical images.

During a CT imaging session, a patient is placed within the imaging device and is exposed to a plurality of x-rays measured with a series of x-ray detectors. A beam of x-rays passes through a particular thin cross-section or "slice" of the patient. The detectors measure the amount of transmitted radiation. This information is used to compute the x-ray attenuation coefficient for sample points in the body. A gray scale image is then constructed based upon the calculated x-ray attenuation coefficients. The shades of gray in the image represent the amount of x-ray absorption of every point within the slice. The slices obtained during a CT session can be reconstructed to provide an anatomically correct representation of the area of interest within the body that has been exposed to the x-rays.

During a MR imaging session, the patient is placed inside a strong magnetic field generated by a large magnet. Magnetized protons within the patient, such as hydrogen atoms, align with the magnetic field produced by the magnet. A particular slice of the patient is exposed to radio waves that create an oscillating magnetic field perpendicular to the main magnetic field. The slices can be taken in any plane chosen by the physician or technician (hereinafter the "operator") performing the imaging session. The protons in the patient's body first absorb the radio waves and then emit the waves by moving out of alignment with the field. As the protons return to their original state (before excitation), diagnostic images based upon the waves emitted by the patient's body are created. Like CT image slices, MR image slices can be reconstructed to provide an overall picture of the body area of interest. Parts of the body that produce a high signal are displayed as white in an MR image, while those with the lowest signals are displayed as black. Other body parts that have varying signal intensities between high and low are displayed as some shade of gray.

Once initial MR or CT images have been obtained, the images are generally segmented. The segmentation process classifies the pixels or voxels of an image into a certain number of classes that are homogeneous with respect to some characteristic (i.e. intensity, texture, etc.). For example, in a segmented image of the brain, the material of the brain can be categorized into three classes: gray matter, white matter, and cerebrospinal fluid. Individual colors can be used to mark regions of each class after the segmentation has been completed. Once the segmented image is developed, surgeons can use the segmented images to plan surgical techniques.

Generally, creating a segmented CT or MR image involves several steps. A data set is created by capturing CT or MR slices of data. Through the segmentation process, a gray scale value is then assigned to each point in the data set. This standard of coloring allows the individual viewing the image to easily understand the objects being represented in the images.

FIG. 1 illustrates a medical imaging system 100 to which embodiments of the invention are applicable. The system includes an imaging device 110, a processor 120 and an interface unit 130. Imaging device 110 is adapted to generate a plurality of image data sets 240 and is, for example, a computed tomography (CT) or magnetic resonance (MR) scanner. In the context of CT or MR, acquisition of image data is generally referred to as "scans". In an exemplary embodiment, the images are acquired using a CT imaging device. Processor 120 is configured to perform computations in accordance with embodiments of the present invention which will be described in greater detail with reference to FIG. 2. Processor 120 is also configured to perform computation and control functions for well-known image processing techniques such as reconstruction, image data memory storage, segmentation and the like. Processor 120 may comprise a central processing unit (CPU) such as a single integrated circuit, such as a microprocessor, or may comprise any suitable number of integrated circuit devices and/or circuit boards working in cooperation to accomplish the functions of a central processing unit. Processor 120 desirably includes memory. Memory within processor 120 may comprise any type of memory known to those skilled in the art. This includes Dynamic Random Access Memory (DRAM), Static RAM (SRAM), flash memory, cache memory, etc. While not explicitly shown in FIG. 1, the memory may be a single type of memory component or may be composed of many different types of memory components. Processor 120 is also capable of executing programs contained in memory and acting in response to those programs or other activities that may occur in the course of image acquisition and image viewing. As used herein, "adapted to", "configured" and the like refer to mechanical or structural connections between elements to allow the elements to cooperate to provide a described effect; these terms also refer to operation capabilities of electrical elements such as analog or digital computers or application specific devices (such as an application specific integrated circuit (ASIC)) that are programmed to perform a sequel to provide an output in response to given input signals.

Interface unit 130 is coupled to processor 120 and is adapted to allow human users to communicate with system 100. Processor 120 is further adapted to perform computations that are transmitted to interface unit 130 in a coherent manner such that a human user is capable of interpreting the transmitted information. Transmitted information may include images in 2D or 3D, color and gray scale images, and text messages regarding diagnosis and detection information. Interface unit 130 may be a personal computer, an image workstation, a hand held image display unit or any conventional image display platform generally grouped as part of a CT or MRI system.

All data gathered from multiple scans of the patient is to be considered one data set. Each data set can be broken up into smaller units, either pixels or voxels. When the data set is two-dimensional, the image is made up of units called pixels. A pixel is a point in two-dimensional space that can be referenced using two dimensional coordinates, usually x and y. Each pixel in an image is surrounded by eight other pixels, the nine pixels forming a three-by-three square. These eight other pixels, which surround the center pixel, are considered the eight-connected neighbors of the center pixel. When the data set is three-dimensional, the image is displayed in units called voxels. A voxel is a point in three-dimensional space that can be referenced using three-dimensional coordinates, usually x, y and z. Each voxel is surrounded by twenty-six other voxels. These twenty-six voxels can be considered the twenty-six connected neighbors of the original voxel.

As part of acquiring the image data, it is to be appreciated by one skilled in the art that appropriate patient scanning protocol is needed. For example, chest exams using CT or MRI typically require the patient (subject) to hold their breath to reduce motion artifacts in the image data due to patient respiration. Usually, CT or MRI exams are taken during full inspiration or full expiration. Further, contrast agents may be used to attenuate the x-ray radiation in particular areas of the body. Contrast agents help improve the differentiation between tissues which are affected by the contrast agents and tissues which are not affected. In the CT image, a CT number difference between contrasted and non-contrasted tissues will be larger than normal. Contrast agents are administered to the patient orally, intravenously or rectally.

Once image data is acquired from the imaging methods described above, image processor 120 is adapted to perform processing to measure disease relevant tissue changes in accordance with embodiments of the present invention which will now be described in greater detail below. As was described in the background, measuring tissue changes and the volume of the lung area are key indicators in the diagnosis and staging of chronic obstructive pulmonary disease (COPD), particularly emphysema.

Figure 2:
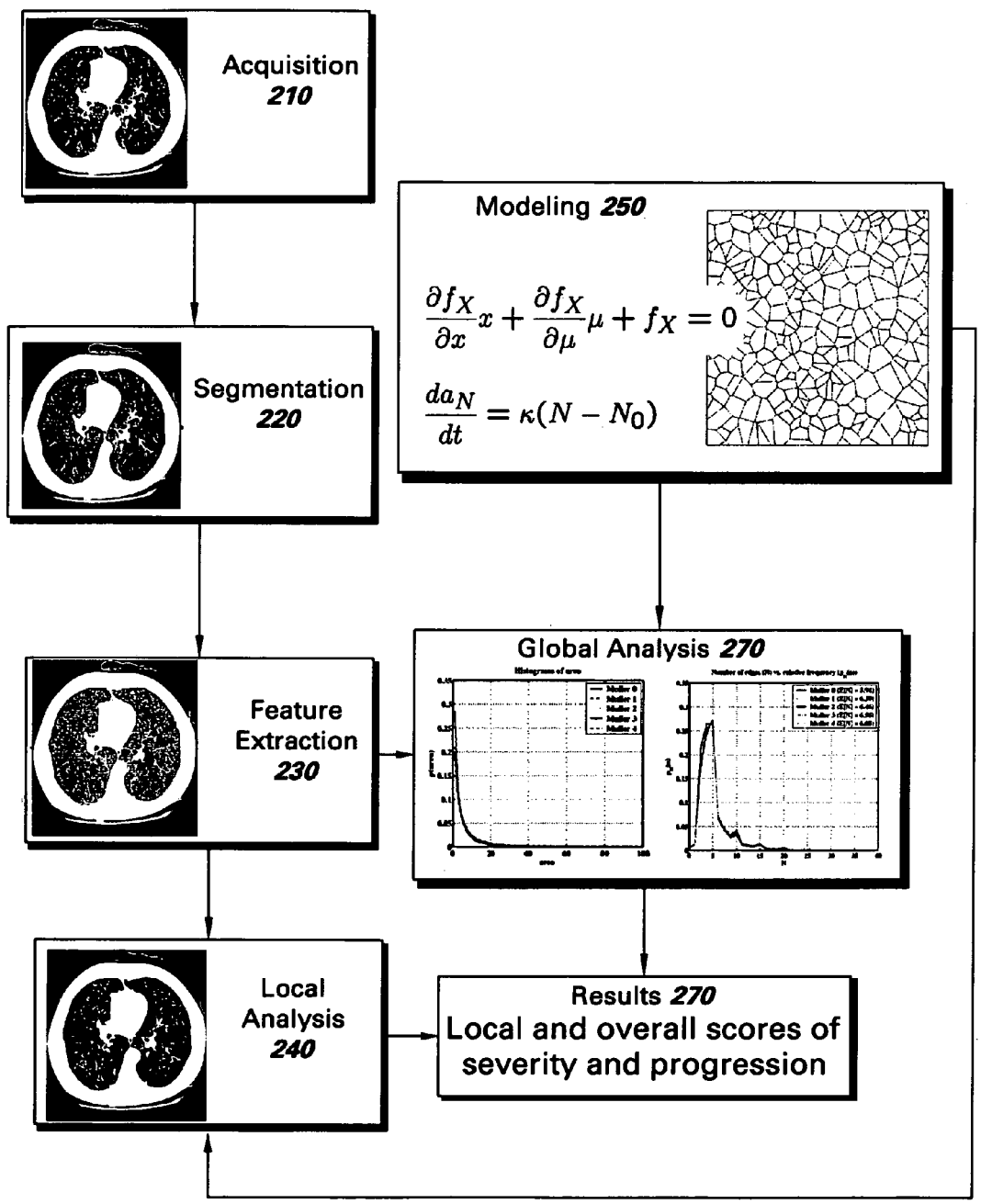

Referring to FIG. 2, a method for measuring, quantifying and/or predicting disease relevant changes is provided. As used herein, the term "disease relevant changes" refers to changes associated with a disease of interest. For example, the number of edges of lung tissue cells, the intensity of affected areas of the lung and the area of the affected areas of the lung are indicators of the presence of emphysema and changes in these aspects indicate progression of the disease. The image data is acquired at 210 and segmented at 220 by a plurality of segmentation steps. The segmentation segments into regions having different properties, for example intensity, area, perimeter, aspect ratio, diameter, variance, derivatives and other properties that may be of interest for a given disease. The segmentation steps may be selected from many known segmentation techniques. At 230, feature extraction is performed on the segmented image data to extract relevant features for a given disease. For example, the number of edges, area and intensity are particularly relevant. As described thus far, the techniques of acquisition, segmentation, and feature extraction may employ many various known techniques to extract relevant image information, or alternatively suspicious regions, for a given disease. However, in embodiments of the invention, further processing is performed to make predictions relating to certain areas or suspicious regions for use in predicting, quantifying or diagnosing a given disease. Thereafter, the suspicious regions can be displayed as an image to the user using many techniques well known in the art. In a preferred embodiment, the technique is to display colored polygons on top of the image data. The colored polygons or similar highlighted regions would correspond to values resulting from the analysis in greater detail below. Further, the results of the segmented regions are desirably displayed as highlighted regions overlaying the original image data. Display may be two-dimensional (2D) or three-dimensional.

In an embodiment of the present invention, a method for at least one of quantifying, diagnosing and predicting disease relevant changes acquired from image data is provided. The method comprises applying at least one segmenting process to the image data to generate a plurality of segmented regions of interest, extracting features relevant for a given disease from the segmented regions to generate extracted features, and mathematically modeling the features for use in one of diagnosing, quantifying and predicting changes indicative of the given disease. In the example of a lung, the segmenting step comprises segmenting a plurality of sub-regions within the lung and further segmenting for parameters within the sub-regions, the parameters being at least one of edges, area and intensity, although other segmentation parameters known to one skilled in the art may be segmented also.

The mathematical modeling step, shown in FIG. 2 as step 250, enables a biological phenomena to be modeled physically using known physical modeling principles. In a preferred embodiment, the mathematical modeling is performed using free boundary models such as those that obey von Neumann's Law. Von Neumann's Law is a known principle used to explain bubble structures or crystal lattice structures made up of a plurality of cells. According to von Neumann's Law cells with many edges tend to grown and cells with few edges tend to shrink. By modeling anatomical structures and corresponding cells, such as the lung and lung cells, the model is able to detect cells with many edges and few edges. The number of edges are used to predict the possibility of disease progression. Von Neumann's Law holds that cells is 6 edges are stable. The equation for Von Neumann's Law is expressed as:

$$\frac{da_N}{dt} = \kappa(N - N_o)$$ Equation (1)

where N is the number of edges and NO is 6 and κ is a scaling parameter that depends on the physical and chemical properties of the modeled structure. In using von Neumann's Law to model biological changes, it is possible to estimate or predict growth or progression of the disease. Cells grow or shrink at a linear rate according to von Neumann's Law. Although, the effects of emphysema cannot be reversed at this time, the growth or progression of emphysema can be monitored using the principles described above. Thus, behavior of each cell can be predicted up to topological changes.

Another important property of many free boundary models is scale invariance. It states that the normalized distribution $$f_X(X/\mu)/\mu,$$

where X is a random variable associated to a geometric measure of cell in the ensemble of cells that form the modeled structure, and μ is the average value of X, satisfies the differential equation $$\frac{\partial f_X}{\partial x}x + \frac{\partial f_X}{\partial \mu}\mu + f_X = 0$$ Equation (2)

This property allows for the comparison of the probability distribution of a geometric parameter, such as area or perimeter, to be compared against a standard provided by the normalized distribution of that same parameter, and deviations or differences in this comparison can be employed as a diagnostic and quantification for the disease.

The embodiments described above focus on the given disease being emphysema and the features relevant for emphysema are area of affected regions of a lung, intensity of regions of the lung and number of edges of cells within the lung. However, it is to be appreciated that other diseases may be explained by von Neumann's Law. Similarly, von Neumann's Law is an exemplary embodiment for mathematical modeling. There are many other known principles and techniques, such as a Potts model, Markov chain, Gibbs chain, Monte Carlo algorithm, diffusion equations, or phase field model, for described cells having a lattice or bubble structure that may be used as well.

Referring further to FIG. 2, the modeled cells and extracted features are analyzed in step 240 for local and overall scores of severity and progression. Local analysis would focus on a selected region(s) of interest where overall scores would focus on disease progression. Typically, there are stages of disease that are based on many factors including areas of disease tissues versus healthy tissue, rate of change measurements and spatial distribution of affected areas, which are to some extent standard in the clinical field. As part of diagnosing and treating a patient, scoring is used to stage the patient.

The analysis includes analyzing the extracted features to assess severity and progression of the given disease. Additionally, there is desirably a global analysis step 260 in which the extracted features are processed using at least one histogram analysis to measure several features using histograms that are well-known in the art of analyzing images.

Once the processing described above is complete, the method may further comprise generating output of the level and progression of the disease. For example, the output may be used for staging the given disease in a patient, measuring response to therapy, phenotyping for patient selection to participate in drug trials, measuring stability of an anatomical structure and prediction of rate of change of the given disease. As used herein, phenotyping refers to observing physical or biochemical characteristics, as determined by both genetic makeup and environmental influences and to express a specific trait, such as stature or blood type, based on the influences. A phenotype is an individual or group of organisms exhibiting a particular phenotype.

Additionally, the output may comprise a display of the analysis results as well as identify suspicious areas as extracted in the methods described above. The display may be highlighted regions in the image where the highlighted regions correspond to values from the analysis. In a preferred embodiment, colored polygons are displayed on top of the image data. The display may be 2D or 3D.

Further, a system for at least one of quantifying, diagnosing and predicting disease relevant changes from acquired image data is provided. The system comprises an imaging device for acquiring the image data and an image processor. The image processor is configured for applying at least one segmenting process to the image data to generate a plurality of segmented regions of interest and extracting features relevant for a given disease from the segmented regions to generate extracted features, and the image processor further configured for mathematically modeling the features for use in one of diagnosing, quantifying and predicting changes indicative of the given disease.

The embodiments of the invention presented in previous paragraphs focus on the problem of locating suspicious regions in CT lung scans. It is to be appreciated that the measuring techniques can be directly transferred to other imaging modalities (for example MRI, X-ray, ultrasound scanner, positron emission tomography (PET) scanner). Further, the embodiments of the invention presented above focus on the disease relevant changes relating to emphysema in the lung, but it is to be appreciated that other biological changes in other anatomical regions may also benefit from the mathematical modeling techniques described above.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A method for at least one of quantifying, diagnosing and predicting disease relevant changes acquired from image data comprising:
   applying at least one segmenting process to the image data to generate a plurality of segmented regions of interest;
   extracting features relevant for a given disease from the segmented regions to generate extracted features;
   mathematically modeling the features for use in one of diagnosing, quantifying and predicting changes indicative of the given disease;
   analyzing the extracted features to assess severity and progression of the given disease; and,
   generating output indicative of a level and progression of the disease wherein the output comprises highlighted regions corresponding to values of the extraction step.

2. The method of claim 1 wherein the given disease is emphysema and the features relevant for emphysema are respective areas of affected regions of a lung, intensity of regions of the lung and number of edges of cells within the lung.

3. The method of claim 1 wherein the extracting step comprises generating at least one histogram analysis for a given feature in order to extract the feature.

4. The method of claim 1 wherein the region of interest is a lung and the image data is acquired by at least one of computed tomography (CT), magnetic resonance imaging (MRI), x-ray and ultrasound.

5. The method of claim 4 wherein the segmenting step comprises segmenting a plurality of sub-regions within the lung and further segmenting for parameters within the sub-regions.

6. The method of claim 1 wherein the highlighted regions are displayed overlaying the image data.

7. The method of claim 1 wherein the output is used for at least one of staging the given disease in a patient, measuring response to therapy, phenotyping for patient selection to participate in drug trials, measuring stability of an anatomical structure and prediction of rate of change of the given disease.

8. The method of claim 1, wherein the mathematical modeling step comprises using free boundary models.

9. A system for at least one of quantifying, diagnosing and predicting disease relevant changes from acquired image data comprising:
   an imaging device for acquiring the image data; and,
   an image processor configured for applying at least one segmenting process to the image data to generate a plurality of segmented regions of interest and extracting features relevant for a given disease from the segmented regions to generate extracted features, and the image processor further configured for mathematically modeling the features, for use in one of diagnosing, quantifying and predicting changes indicative of the given disease; and,
   an interface unit to display an output wherein the output is used for at least one of staging the given disease in a patient, measuring response to therapy, phenotyping for patient selection to participate in drug trials, measuring stability of an anatomical structure or predicting rate of change of the given disease.

10. The system of claim 9 wherein the given disease is emphysema and the features relevant for emphysema are area of affected regions of a lung, intensity of regions of the lung and number of edges of cells within the lung.

11. The system of claim 9 wherein the image processor is further configured for analyzing the extracted features to assess severity and progression of the given disease.

12. The system of claim 9 wherein the image processor is configured to extract features by generating at least one histogram analysis for a given feature in order to extract the features.

13. The system of claim 9 wherein the region of interest is a lung and the image data is acquired by at least one of computed tomography (CT), magnetic resonance imaging (MRI), x-ray and ultrasound.

14. The system of claim 13 wherein image processor is configured for segmenting a plurality of sub-regions within the lung and further segmenting for parameters within the sub-regions, the parameters being at least one of edges, area and intensity.

15. The system of claim 9 further comprising an interface unit to display an output and wherein the output comprises highlighted regions corresponding to values of the extracting step.

16. The system of claim 15 wherein the highlighted regions are displayed overlaying the image data.

17. The system of claim 9 wherein the mathematical modeling comprises using free boundary models.

18. A method for at least one of diagnosing, quantifying and predicting emphysema from acquired medical image data comprising:
applying at least one segmentation to the acquired medical image data to generate a plurality of segmented regions of interest;
extracting features relevant for emphysema from the segmented regions to generate extracted features;
mathematically modeling the features for use in one of diagnosing, quantifying and predicting changes indicative of the emphysema;
analyzing the extracted features to assess severity and progression, of emphysema; and,
generating output indicative of a level and progression of emphysema wherein the output comprises highlighted regions corresponding to values of the extraction step.

19. The method of claim 18 wherein the features relevant for emphysema are area of affected regions of a lung, intensity of regions of the lung and number of edges of cells within the lung.

20. The method of claim 18, wherein the mathematical modeling step comprises using free boundary models.

* * * * *